JOHN HABERMEHL & HENRY KLEIMAN.

Improvement in Steam Water Ejectors.

No. 124,895.                                   Patented March 26, 1872.

Witnesses:                                          Inventor:
Charles Otto Lappe                              John Habermehl
Ernest Mangold                                  Henry Kleiman

UNITED STATES PATENT OFFICE.

JOHN HABERMEHL AND HENRY KLEIMAN, OF ALLEGHENY, PENN.

IMPROVEMENT IN STEAM WATER-EJECTORS.

Specification forming part of Letters Patent No. 124,895, dated March 26, 1872.

Be it known that we, JOHN HABERMEHL and HENRY KLEIMAN, both of the city of Allegheny and State of Pennsylvania, have invented a new and useful Improvement in Steam Water-Ejectors, commonly named "steam siphon-pumps," which we have invented together and jointly; and we hereby declare that the following is a full and exact description of the same, which will enable others skilled in the art to make it, reference being had to the accompanying drawing forming part of this specification.

Figure 1:
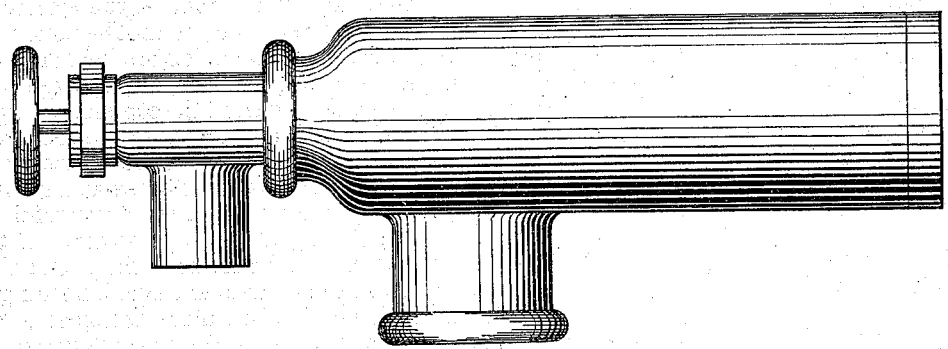
Figure 2:
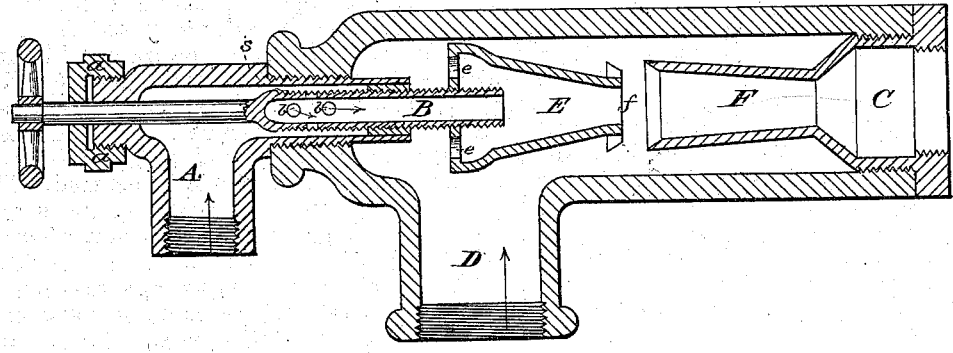

Figure 1 represents a perspective view of our invention. Fig. 2 is a sectional view of the same.

Our improvement relates to the above-named pumps, used for elevating or forcing water by means of steam; and has for its object to regulate the quantity of water so as to produce a superior result in starting, elevating, or forcing water where other pumps of the same nature with the same capacity would fail to operate. This is done by means of two water-chambers, one of which is adjustable and smaller than the other, and which said chambers, by the moving of one, can be united so that the water will only enter into the smaller chamber; or they can be separated so that the larger chamber will receive an additional supply of water.

A, Fig. 2, represents the supply steam-nozzle, which contains another nozzle, inside of the same, B, through which the steam is finally discharged, passing through water-chambers E and F. The steam-nozzle A has an open space or chamber in the middle, and is closed at both ends, and nozzle B runs through the center of the same, working in a thread at the inner end of nozzle A; and at the outer end of nozzle A a stuffing-box is used to prevent the steam from escaping around the rod of nozzle B, as shown at $a$. Water-chamber E is fastened to the end of nozzle B, and water-chamber F is fastened at the discharge end of the outer shell or water-chamber, inclosing both of said chambers, as shown by Fig. 2. By reason of water-chamber E being fastened to the inner end of nozzle B, our adjustable arrangement has much less strain upon its working parts, and is adjustable with greater facility and ease than other adjustable steam water-ejectors. The strain is all upon nozzle or steam-chamber A, leaving nozzle B with free-play room to work with ease, so that the adjustment can be made any time, whether the ejector be in operation or not, which cannot be done with other adjustable steam-ejectors, which have such a strain upon their screw-thread joints when in operation, with all the connection-pipes attached to the same, that it requires great power to regulate them. That the adjusting arrangement should work with ease at any time is highly important to produce any useful result in regulating the flow of water. If the adjustment cannot be made without shutting off the steam the adjustment avails nothing in starting the ejector, in which case most of the steam is wasted. After the water is in motion an additional supply may be added, but it must be while in motion, and more in particular in case of putting out fires on ships or steamboats, the adjustment must be made with speed to avail anything.

When in operation the steam enters nozzle A, from which it passes into nozzle B at the openings $b$ $b$, and from thence through both water-chambers E and F. The water coming from the suction-pipe D enters at the end of chamber E, near the sides of nozzle B, at the openings $e$ $e$, and part of the water will enter chamber F at $f$. The space around the end of chamber E, at the mouth of chamber F, where the water enters at $f$, can be either contracted, enlarged, or entirely closed up by turning nozzle B, to which chamber E is fastened. The adjustment is made by means of the screw-thread S entirely inside the ejector, whereby the leakage is prevented which occurs with a different position of the adjusting screw-thread. The screw-thread may be made on the stem of nozzle B, near the stuffing-box. The two water-chambers are cylindrical or conical in shape, and are made to fit together neatly, with a little projecting shoulder at the end of chamber E, with a corresponding enlargement at the mouth of chamber F, so that when both chambers are separated the space between them, where the water enters at $f$, will be in the shape of a complete circle. Chamber E is made smaller than chamber F, so that when chamber F is closed up in the way described it will not require so much steam to put the water in motion as when both chambers are open.

It is a well-known fact that it requires a greater force of steam to start the water than to keep it going after it is in motion. Thus we are enabled in a great measure to overcome this by turning the nozzle B forward, closing up chamber F, and after we get the pump in motion we turn nozzle B backward, which will separate chambers E and F so as to increase the column of water. The force of steam required is just in proportion to the size of the column of water or the distance or height it is to be drawn or forced. In this respect our arrangement to regulate the flow of water can be used to a great advantage in putting out fires in buildings where steam is used, or on steamships and steamboats. If the steam be low, the column of water can be regulated to suit the force of steam to start the water immediately; or if there is sufficient steam to start both chambers at once, by shutting off part of the water we are enabled to force a smaller column much higher to reach places on fire which could not be reached with a larger stream of water.

Although the above-named adjustable chambers E and F will work best in the shape described, their precise form is not absolutely necessary. We do not limit ourselves to their precise form or shape.

We claim as our invention—

1. Nozzle B, in combination with nozzle A and water-chamber E, adjustable without any strain upon its screw-thread joint, constructed and operating in the manner described, and for the purposes set forth.

2. The adjustable water-chamber E, in combination with water-chamber F and steam-nozzle B "with screw-thread S inside the ejector," substantially as and for the purposes set forth.

JOHN HABERMEHL.

Witnesses:
HENRY KLEIMAN.
JOSEPH H. ROTROCK, Jr.,
A. ARENT.